United States Patent [19]
Hunt et al.

[11] 4,136,280
[45] * Jan. 23, 1979

[54] POSITIVE AND NEGATIVE ION RECORDING SYSTEM FOR MASS SPECTROMETER

[75] Inventors: Donald F. Hunt; George C. Stafford, Jr., both of Charlottesville, Va.

[73] Assignee: University of Virginia, Charlottesville, Va.

[ * ] Notice: The portion of the term of this patent subsequent to Jan. 3, 1995, has been disclaimed.

[21] Appl. No.: 795,148

[22] Filed: May 9, 1977

Related U.S. Application Data

[63] Continuation-in-part of Ser. No. 650,783, Jan. 20, 1976, Pat. No. 4,066,894.

[51] Int. Cl.[2] ........................ B01D 59/44; H01J 39/40
[52] U.S. Cl. .................................... 250/292; 250/285; 250/282
[58] Field of Search ............... 250/423, 424, 292, 291, 250/293, 281, 282, 285

[56] References Cited

U.S. PATENT DOCUMENTS

| | | | |
|---|---|---|---|
| 3,280,326 | 10/1966 | Günther | 250/292 |
| 3,555,272 | 1/1971 | Munson et al. | 250/424 |
| 4,066,894 | 1/1978 | Hunt et al. | 250/292 |

*Primary Examiner*—Bruce C. Anderson
*Attorney, Agent, or Firm*—Oblon, Fisher, Spivak, McClelland & Maier

[57] ABSTRACT

A method and an apparatus are disclosed for adapting a conventional quadrupole mass spectrometer to substantially simultaneously produce and record both positive and negative ions. The apparatus includes a control circuit for rapidly switching the repeller, source and lens electrodes of a quadrupole mass spectrometer between positive and negative potentials. This switching of the potentials, along with the selection of appropriately favorable ionization conditions, permits the generation of suitable streams of positive and negative ions. A dual electron multiplier detector is used for separately sensing the positive and negative ions transmitted through the quadrupole mass spectrometer. The disclosed method and apparatus are particularly suitable for obtaining accurate mass measurements using a quadrupole mass spectrometer.

12 Claims, 5 Drawing Figures

POSITIVE AND NEGATIVE ION RECORDING SYSTEM FOR MASS SPECTROMETER

The invention described herein was made in the course of or under a grant from the Department of Health, Education and Welfare and the Department of the Army.

CROSS-REFERENCE TO RELATED APPLICATIONS

This application is a continuation-on-part of Application Ser. No. 650,783, filed on Jan. 20, 1976 U.S. Pat. No. 4,066,894.

BACKGROUND OF THE INVENTION

1. Field of the Invention

The present invention relates generally to the field of quadrupole mass spectroscopy, and more particularly to a method and apparatus for producing and monitoring both positive and negative ions using a quadrupole mass spectrometer.

2. Description of the Prior Art

In quadrupole mass spectrometers, ions of different masses are separated by a quadrupole filter. Although positive and negative ions can be transmitted simultaneously through such a filter, conventionally available devices permit ions of only one polarity to be extracted from the filter for detection and data processing. Normally, only positive ions are detected primarily because commercially available devices are constructed and operated under conditions favoring the generation of positive ions and because electron multipliers are normally operated at negative potentials, thus tending to attract only positive ions and repel negative ions.

Some devices have been constructed which permit sequential detection of positive and negative ions. One such device is sold by Extranuclear Laboratories, Incorporated, of Pittsburgh, Pa. This device is a quadrupole mass spectrometer which includes a toggle switch for reversing voltage polarities on a single electron multiplier and ion source. A delay of approximately ten seconds is required between recording ions of different polarities. The delay period required for switching between positive and negative ion detection in these machines is sufficiently long so that simultaneous or near simultaneous recording of ions of both polarities is completely impossible, with the result that accurate mass measurements can only be made in great difficulty and not at all on certain ions with such machines. Similarly, it is not possible to record both positive and negative ion spectra on a single injection of sample molecules introduced into such machines through a gas chromatograph, for example. These factors emphasize the point that sequential detection of positive and negative ions is not at all equivalent to simultaneous, or effectively simultaneous, detection of both polarities of ions. The capability of sequential detection of both types of ions is essentially equivalent to using two separate mass spectrometers to process positive and negative ions, and fails to attain the synergistic effects possible with simultaneous or near simultaneous detection.

It is well understood by those skilled in the art that substantially simultaneous recording of both positive and negative ion species in quadrupole mass spectrometers would be highly desirable in that it would greatly facilitate the making of accurate mass measurements, among other things. In obtaining mass measurements, for example, it is necessary that some means be found to distinguish the ions emanating from an internal standard from those emanating from an unknown sample of nearly the same unit mass as the standard. According to the present invention, distinguishing between ions emanating from the standard and those emanating from the unknown sample is greatly facilitated by operating the mass spectrometer under conditions such that only negative ions, for example, are generated by the internal standard while only positive ions are generated by the sample. Both types of ions are recorded essentially simultaneously using a pulsed ion source, single quadrupole filter, dual electron multiplier detector and dual channel or stereo recording devices with the result that mass measurements with low ppm accuracy can be made with great simplicity.

SUMMARY OF THE INVENTION

Accordingly, it is one object of this invention to provide an improved quadrupole mass spectrometer.

Another object of the present invention is the provision of a novel method for simultaneously recording both positive and negative ions in a mass spectrometer.

Yet another object of the present invention is the provision of a novel apparatus for enabling positive and negative ions to be recorded simultaneously with a quadrupole mass spectrometer.

A still further object of the present invention is the provision of a novel apparatus for converting a conventional quadrupole mass spectrometer into an apparatus for simultaneously recording both positive and negative ions.

Yet another object of the present invention is the provision of a novel method for obtaining accurate mass measurements using a modified quadrupole mass spectrometer.

A still further object of the present invention is the provision of a novel apparatus for enabling a quadrupole mass spectrometer to generate both positive and negative ions for analysis.

Another object of the present invention is the provision of a novel apparatus for simultaneously detecting both positive and negative ions generated by a quadrupole mass spectrometer.

Briefly, these and other objects of the present invention are achieved by the provision of a high speed switching circuit for switching the potentials applied to various controlling electrodes in a quadrupole mass spectrometer and by providing a unique detecting arrangement including a dual electron multiplier device. The method of the present invention also teaches the operation of a quadrupole mass spectrometer under a predetermined set of ionization conditions which are particularly suitable for the production of both negative and positive ions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
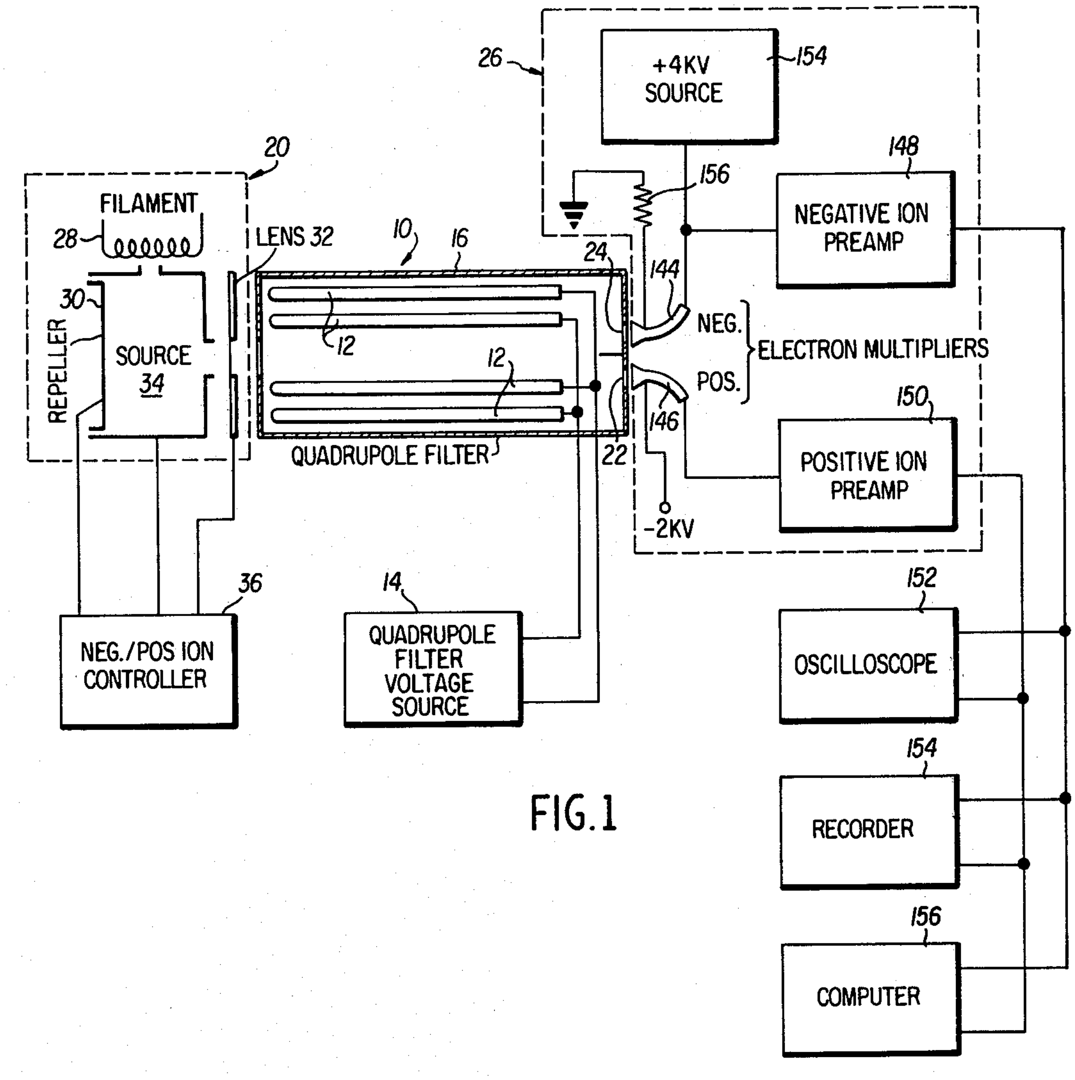
FIG. 1 is a block diagram of the apparatus of the present invention coupled to a quadrupole mass spectrometer.

Referring now to the drawings, wherein like reference numerals designate identical or corresponding parts throughout the several views, and more particularly to FIG. 1 thereof, a block diagram of a quadrupole mass spectrometer modified to record simultaneously both positive and negative ions is illustrated. The illustrated system includes a conventional quadrupole filter 10 of the type used in commercially available quadrupole mass spectrometers. Such filters and mass spectrometers are illustrated in U.S. Pat. Nos. 2,939,952, issued June 7, 1960 to Paul et al. and 3,629,573, issued Dec. 21, 1971 to Carrico. Devices of the types described in these patents are available commercially from the Finnigan Corporation.

The quadrupole filter 10 includes four electrodes 12, conventionally of a rod-like or cylindrical shape. The electrodes are coupled to a standard quadrupole filter voltage source, such as a conventional radio/DC controller produced by the Finnigan Corporation. As is well known to those skilled in the art, the four filter electrodes 12 are divided into two pairs, the first of which receives a radio frequency voltage along with a positive DC voltage, and the other of which receives the same RF voltage but with a 180° phase shift and a negative DC voltage. These voltages give rise to an electrostatic field that gives bounded oscillations to ions of selected mass to charge ratios, and unbounded oscillations to ions of different mass to charge ratios. Thus the quadrupole filter 10 will only pass ions of a predetermined mass to charge ratio. It is noted, however, that the operation of the filter is independent of the polarity of the charge on the ions. Thus any quadrupole filter operates as well with negatively charged ions as with positively charged ions.

The electrodes 12 of the quadrupole filter 10 are conventionally housed within an evacuated chamber 16 including an inlet aperture for receiving ions produced in a conventional ion generator 20, and, in the case of the present invention, including two outlet apertures 22 and 24 for permitting filtered ions to enter a detector 26.

The ion generator 20 is conventional in structure and may be operated in either the electron impact or chemical ionization modes. Ion generators of any other type may also be employed (cf. e.g. U.S. Pat. No. 3,555,272 to Munson et al, issued Jan. 12, 1971). The ion generator includes a filament electrode 28, a repeller electrode 30, an ion lens 32 and a source chamber 34. In a quadrupole mass spectrometer, all of these elements operate at relatively low voltages, i.e., between roughly five and sixty volts.

A negative/positive ion controller 36 is coupled to the repeller 30, lens 32 and source 34 for the purpose of rapidly changing the potentials of these elements. More particularly, the negative/positive ion controller 36 (referred to simply as "ion controller" hereafter) supplies a square wave having a frequency in the range of 10kHz to the repeller, source and lens. The two levels of the square wave are independently variable in accordance with the circuitry of the present invention.

Figure 3:
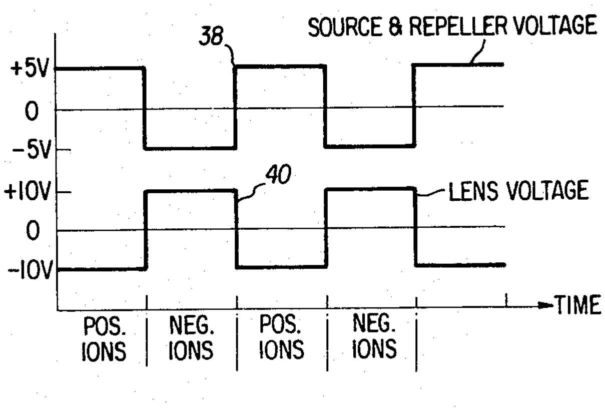
FIG. 3 is a graphical illustration of the output voltage of the negative/positive ion controller of the present invention.

The typical output voltages of the ion controller 36 are illustrated graphically in FIG. 3. The upper square wave curve 38 in FIG. 3 represents the voltage applied by the ion controller 36 to both the repeller 30 and the source 34. As shown, this voltage varies between plus and minus five volts. The lens voltage is illustrated by the lower square wave curve 40 and varies between plus and minus ten volts. The illustrated voltage patterns result in the transmission of alternate bundles of positive and negative ions toward the quadrupole filter 10 where they are mass analyzed and subsequently detected. More specifically, positive ions are transmitted when the source and repeller voltages are positive and the lens voltage is negative, while negative ions are transmitted under the opposite voltage polarity conditions.

Figure 2:
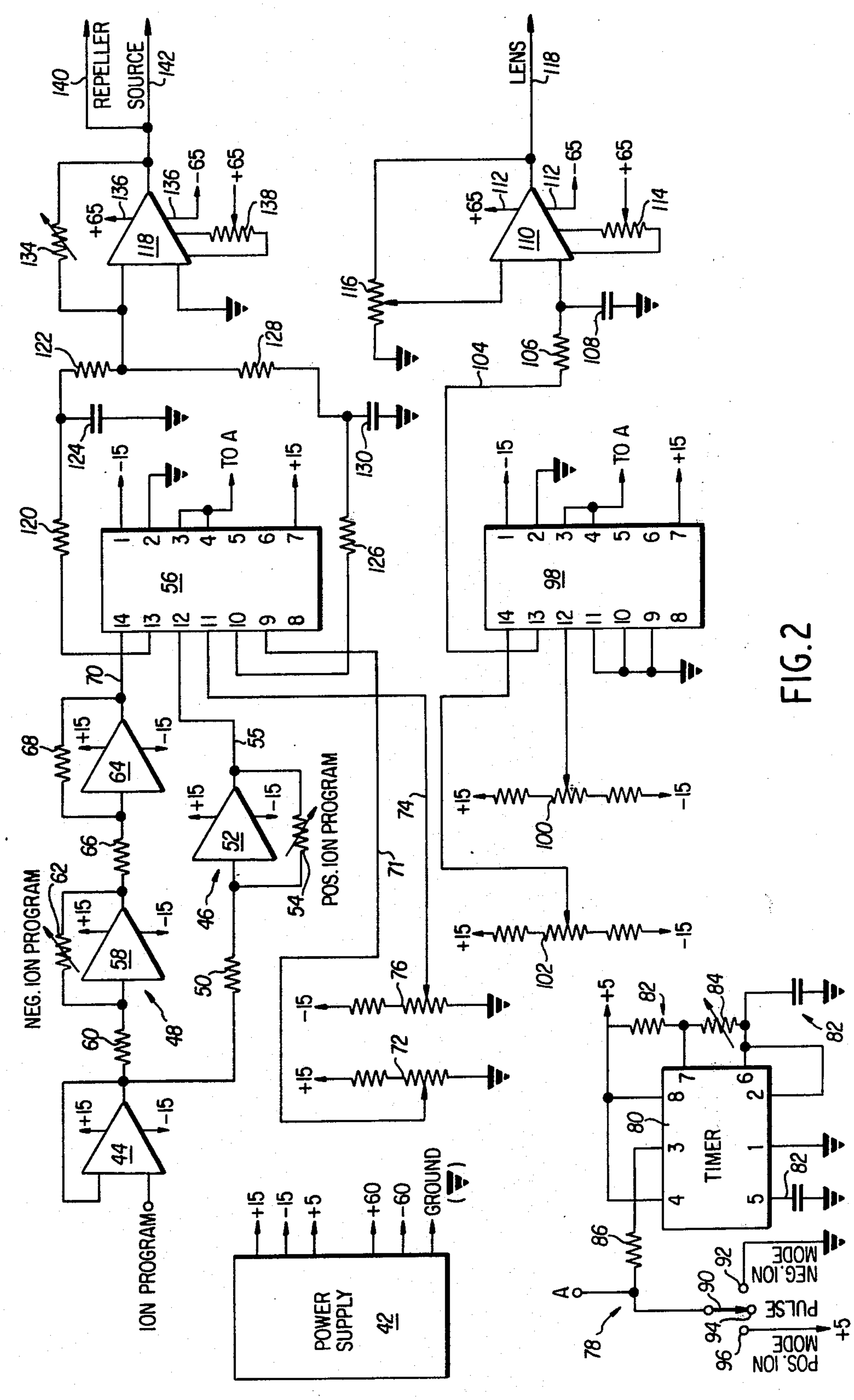
FIG. 2 is a circuit diagram of the negative/positive ion controller circuit of the present invention illustrated in block form in FIG. 1.

The details of the ion controller circuit 36 are illustrated in the schematic diagram of FIG. 2. As shown in FIG. 2 a power supply 42 having outputs of plus five volts, plus and minus fifteen volts and plus and minus sixty volts, as well as a conventional ground is provided to supply required driving power to the illustrated ion controller circuit. The ion controller circuitry includes an isolating amplifier 44, which may be any appropriate dual input amplifier. One input of the amplifier 44 is connected directly to the output thereof, while the other input to the amplifier is connected to the "ion program" output of a conventional quadrupole mass spectrometer, such as the Finnigan device described above. The ion program is a swept DC voltage which is varied in accordance with the mass of the ions being analyzed, allowing the potential of the source 34 to be increased with increasing mass scan.

The output of the isolating amplifier 44 is divided into a positive ion program circuit 46 and a negative ion program circuit 48. The positive ion program circuit 46 includes a coupling resistor 50 connected to the input of a gain control amplifier 52. A variable resistor 54 is coupled in a feedback arrangement across the gain control amplifier 52 to permit adjustment of the gain across the amplifier. The values of the resistors 50 and 54 may be selected so that the output voltage of the amplifier 52 may be varied between zero and one-half of the input voltage. The output of the amplifier 52 is coupled over a line 55 to one input of an integrated switching circuit 56, to be described in more detail subsequently.

The negative ion program circuit includes a gain control amplifier 58, a coupling resistor 60 and a variable resistor 62 coupled across the amplifier 58 to form a circuit that is substantially identical to the positive ion program circuit. An inverter amplifier 64, including coupling and feedback resistors 66 and 68 is, however, coupled to the output of the gain control amplifier 58 in the negative ion program circuit. The output of the inverter amplifier is coupled through a line 70 to a second input of the integrated switching circuit 56.

The switching circuit 56 is preferably a conventional CMOS dual SPDT analog switch conventionally available as a model AD7512 switching circuit from Analog Devices, Inc. The switching circuit includes two output terminals 10 and 13. The input signals received at terminals 9 and 11 are alternately applied to output terminals 10, while the input signals received at terminals 12 and 14 are alternately coupled to the output terminal 13. Of the remaining terminals, terminal 1 is coupled to a source of −15 volts, terminal 2 is grounded, terminals 3 and 4 are coupled to a timing circuit (described subsequently), terminals 5, 6 and 8 are unconnected and terminal 7 is connected to a source of +15 volts. Terminal 9 is coupled over a line 70 to a voltage divider 72, while terminal 11 is similarly coupled over a line 74 to a second voltage divider 76. The voltage dividers 72 and 76 provide offset potentials and permit separate adjustment of the negative and positive source potentials, respectively.

As mentioned previously, the terminals 3 and 4 of integrated switching circuit 56 are coupled together to a point A in a timing circuit 78 illustrated at the lower portion of the figure. The timing circuit includes a conventional integrated circuit timer 80, such as a commercially available Signetics, Inc. model 555 timer. The timer 80 includes the necessary biasing and trimming circuitry, as illustrated at 82 and further includes a variable resistor 84 for adjusting the output frequency. The timer output terminal 3 is connected through a coupling resistor 86 to the point A and to a three-position mode selection switch 88. The three-position switch includes a movable contact 90 which may selectively be coupled to a grounded contact 92, an unconnected or open contact 94 and a contact 96 coupled to the five volt output of power supply 42. The three position switch enables the apparatus of the present invention to be used as both a positive and negative ion generating system (using contact 94), a positive ion system only (contact 96) or a negative ion system only (contact 92). When contact 94 is selected, the timer 80 generates a variable frequency output from 0.1 Hz to 100 kHz for driving the switching circuit 56 and a second switching circuit described below.

A second integrated switchinb circuit 98 is provided, and is preferably identical to the switching circuit 56, described previously. The terminals of the integrated switching circuit 98 are connected as follows: terminal 1 to the source of −15 volts, terminal 2 grounded, terminals 3 and 4 to point A, terminals 5, 6 and 8 not connected, terminal 7 to a source of +15 volts and terminals 9, 10 and 11 are interconnected and coupled to ground. Terminal 12 is coupled to a voltage divider 100 for providing the required lens voltage for positive ion detection, while terminal 14 is coupled to a voltage divider 102 for providing the required lens voltage for negative ion detection. Output terminal 13 of switching circuit 98 is connected through a line 104, a coupling resistor 106 and a filtering capacitor 108 to one input of a conventional power output amplifier 110. A suitable amplifier for this purpose is the Burr Brown Model 3581J, a commercially available device. This amplifier includes power input terminals 112 and a trimming potentiometer 114 for balancing the amplifier. As mentioned previously, one input of the amplifier 110 is coupled to the terminal 13 of integrated switching circuit 98. The other input of the amplifier 110 is coupled to a variable resistor 116 connected in a feedback configuration across the amplifier for the purpose of providing gain control. The output of the amplifier is coupled over a line 118 to the lens 32 illustrated in FIG. 1.

A substantially identical power output amplifier 118 is connected through coupling resistors 120, 122 and filtering capacitor 124 to output terminal 13 of integrated switching circuit 56. The output terminal 10 of integrated switching circuit 56 is also coupled through coupling resistors 126, 128 and filtering capacitor 130 to the same input of the power amplifier 118. A variable resistor 134 is coupled between the non-grounded input of the amplifier 118 and its output in feedback relationship to provide gain control. As with amplifier 110, appropriate power input leads 136 and a trimming potentiometer 138 are provided with the amplifier 118. The output of the amplifier is supplied over lines 140 and 142 to the repeller 30 and source 34 illustrated in FIG. 1.

In operation, the various voltage dividers 72, 76, 100 and 102 are first set to provide the appropriate output voltage levels for the source, repeller and lens voltages, respectively. It is noted that the voltage levels for generating positive and negative ions are separately adjustable. All other trimming and gain controlling resistors are also set the appropriate values to deliver the proper output gain. All power supply leads are appropriately coupled and the isolating amplifier 44 is coupled to the ion program output of the quadrupole mass spectrometer. The mode switch 88 is then used to select the mode of operation of the device. If the contact 90 engages contact 96, the spectrometer operates in the positive ion mode, and similarly if the contact 90 engages the contact 92, the spectrometer operates strictly in the negative ion mode. In both cases the timer 80 remains inoperative. If the contact 90 engages the contact 94, however, the timer 80 becomes operative and provides triggering inputs to the control terminals 3 and 4 of the integrated switching circuits 56 and 98 for controlling the switching intervals of these circuits. The frequency of the timer 80 is set to an appropriate value in the range mentioned previously for producing two square wave outputs of the type illustrated in FIG. 3, one for supplying an appropriate voltage to the source 34 and repeller 30 and a second for applying an appropriate voltage to the lens 32. It is apparent from the previous discussion that the switching circuits operate to alternately apply the signal received on input terminals 12 and 14 to output terminals 13, and similarly to apply the input voltage received at terminals 9 and 11 to output terminals 10 (the latter applies only to switching circuit 56 since switching circuit 98 requires only one output from terminal 13). These output signals are appropriately amplified by the power output amplifiers 110 and 118 to drive the repeller, source lens of the mass spectrometer. The rapid changes in the potentials of these elements result in the generation of a train of alternate pulses or "bundles" of positive and negative ions. The frequency of the pulse train is, of course, the same as that of the timer 80. If this frequency is 5 kHz, for example, it will be apparent that positive and negative ions reach the detector 26 approximately simultaneously.

Attention is again directed to FIG. 1, and particularly to the ion detector 26 illustrated at the right of that figure. As mentioned previously, a single electron multiplier cannot be used to detect both positive and negative ions in view of the fact that electron multipliers are conventionally operated at a high bias potential. Although this bias potential may be either a positive or a negative voltage, whichever voltage is selected tends to repel ions of the same polarity in view of the fact that the ions transmitted through a quadrupole mass spectrometer have very low energy levels. Accordingly, it was necessary to develop a dual multiplier detector apparatus for use with the present invention in order to permit simultaneous detection of both positive and negative ions. The dual electron multiplier apparatus is shown in block diagrammatic form in FIG. 1 as including a pair of standard electron multiplier tubes 144 and 146, both of the type conventionally used in mass spectrometers. Galileo continuous dynode multipliers may be used, for example. The outputs of the electron multiplier tubes 144 and 146 are respectively applied to a negative ion preamplifier 148 and a positive ion preamplifier 150. The outputs of these preamplifiers are subsequently fed to suitable conventional data processing equipment, such as an oscilloscope 152, a chart recorder 154 and a computer 156, although other types of analytical equipment may also be used.

The positive ion channel of the electron multiplier system described above is essentially a conventional channel of the type that is standard equipment with the Finnigan mass spectrometer previously referenced. The electron multiplier tube 146 is conventionally biased at −2KV at its input, whereby only positive ions are attracted to it for processing. Any negative ions passing through the quadrupole filter 10 would thus be repelled by the large negative bias on the tube 146, preventing any further detection or processing of negative ions. Accordingly, the negative ion channel added to the apparatus of the present invention is adapted to attract and process negative ions. To do so, the negative ion electron multiplier tube 144 is biased such that its output is coupled to a voltage source 154 which supplies a bias voltage of approximately +4KV. The input of the electron multiplier 144 is coupled to ground potential through a large isolating resistor 156, whereby the input of the tube 144 is maintained at a high positive potential for attracting negative ions.

To accommodate the high positive bias of the tube 144, the negative ion preamplifier 148 must be capable of operating at approximately 4KV above ground potential. This requirement is met by conventionally available amplifiers, such as an Extranuclear model 032-4 Negative/Positive Ion Preamplifier.

Figure 5:
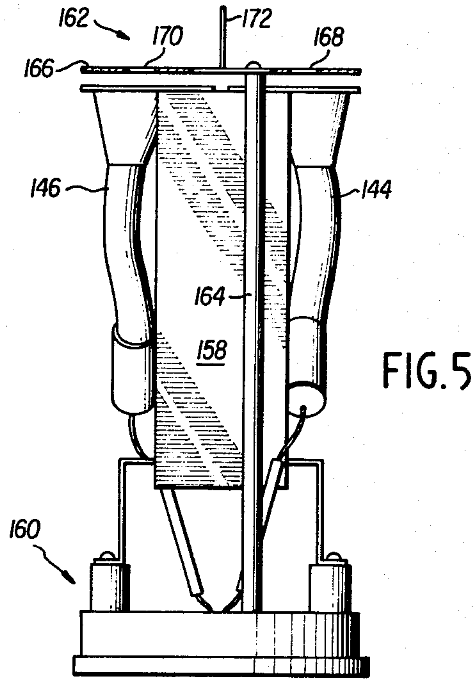
Figure 4:
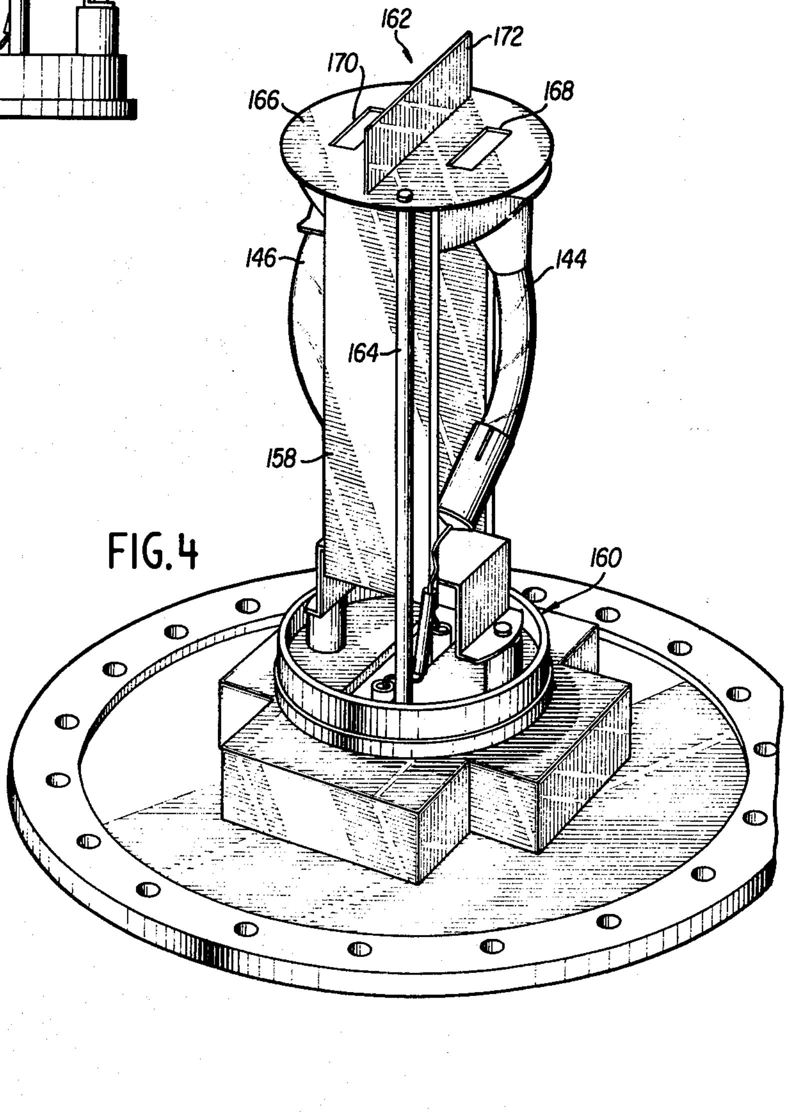
FIG. 4 is a perspective illustration of the dual electron multiplier structure of the present invention; and, FIG. 5 is a side view of the dual electron multiplier illustrated in FIG. 4.

FIGS. 4 and 5 illustrate the mechanical structure of the dual electron multiplier structure of the present invention. As shown, the tubes 144 and 146 are secured to a mounting structure or panel 158 preferably formed of a high-grade insulating material such as a conventional high dielectric ceramic material. The mounting structure 158 is secured to a base 160 preferably formed of metal and provided for enabling the dual multiplier structure to be secured to the remaining portions of the mass spectrometer apparatus in a vacuum tight manner.

To prevent cross talk between the positive and negative ion detection channels, an X-ray shield 162 is mounted in front of the input ends of the electron multiplier tubes 144 and 146. The shield 162 is secured to base 160 by means of a metal supporting rod 164 which also serves to maintain the shield 162 at ground potential. The shield 162 includes a disc portion 166 of a diameter sufficient to completely cover the faces of both of the electron-multiplier tubes 144 and 146. A pair of slots 168 and 170 are formed in the disc 166 and are positioned to be adjacent the central input areas of the tubes 144 and 146, respectively. Finally, a dividing fin 172, preferably formed of a conductive material, is secured to the outward face of disc 166 across the diameter of the disc at a point equally spaced from the slots 168 and 170. The dividing fin is of such a height as to very closely approach the electrodes 12 within the quadrupole filter 10 when the mass spectrometer apparatus is fully assembled. When so constructed the dividing fin together with the remaining structure of the shield 162 greatly reduces cross-talk between the positive and negative ion channels.

As mentioned previously, one aspect of the present invention includes operating the apparatus of the invention under appropriate conditions to produce both positive and negative ions. An exemplary set of suitable conditions involves the use of isobutane at one torr as the reagent gas and perfluorokerosene as the internal standard. Electron bombardment of this mixture plus a sample produces the $C_4H_9^+$ ion and a population of thermal or near thermal electrons. The $C_4H_9^+$ ions function as a Bronsted acid and protonate most organic samples to form M+1 ions, where M is the molecular weight of the sample. The reagent ion, $C_4H_9^+$, does not react with perfluorokerosene, however, so the positive ion beam consists entirely of $C_4H_9^+$ ions together with sample ions.

In contrast to the above-described situation, the internal standard captures thermal electrons but isobutane and most organic molecules do not. Accordingly, only ions derived from the internal standard, perfluorokerosene, appear in the negative ion output. Since both positive and negative ion spectra are recorded simultaneously in accordance with the principles of the present invention, extrapolation from the known mass of the ions derived from the standard provides an indication of the exact mass of the M+1 ions derived from the sample. The elemental composition of the unknown sample is then easily determined from published tables of compositions and exact masses.

It will, of course, be apparent to those skilled in the art of chemical ionization mass spectrometry that various other reagent gas compositions can also be used to produce the desired output of a variety of different positive and negative sample ions carrying useful structural information in accordance with the teachings of the present invention.

The operation of the present invention will now be described in more detail. A conventional quadrapole mass spectrometer, such as a Finnigan unit of the type previously described is initially modified by the addition of a positive/negative ion controller of the type described in detail above. The positive/negative ion controller is coupled to the repeller, source and lens electrodes of the mass spectrometer for varying the potential of these elements in the manner shown, for example, in FIG. 3. The conventional ion detecting system of the mass spectrometer is replaced with the dual multiplier apparatus of the present invention and the mass spectrometer is operated under the preferred conditions set forth above. Once the appropriate controls of the negative/positive ion controller are appropriately set in accordance with the teachings of the present invention, the apparatus is operated normally to provide detection of both positive and negative ions. The use of dual input channel recorders and stereo oscilloscopes facilitates the simultaneous comparison of positive and negative ion data.

Various modifications of the present invention are, of course, possible. The dual electron multiplier housing along with the X-ray shield 162 and dividing fin 172 may be sprayed with graphite, or a suitable equivalent composition, for the purpose of suppressing secondary electron emission. Such a treatment of the system tends to further reduce noise and cross-talk.

Similarly, a Faraday cup system can be used in place of the dual electron multipliers for detecting both positive and negative ions. However, the use of a Faraday cup provides a much lower sensitivity than the electron multiplier system described in detail above.

It will be apparent to those skilled in the art from the foregoing disclosure that other forms of pulsing or polarity reversing circuitry can be used to achieve the purpose of the present invention. For example, it is not necessary that the pulsing circuitry be used to pulse the source and lens electrodes. As an alternative, the quadrupole filter electrodes or rods and lens electrodes may be pulsed while the ion source is maintained at a constant potential, such as ground. These two alternative techniques of operation are clearly equivalent since in both instances positive and negative ions are alternatively sampled from the ion source and subsequently mass analyzed and detected.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of generating and monitoring positive and negative ions substantially simultaneously using a quadrupole mass spectrometer having an ion generator with repeller, source and lens electrodes, and a quadrupole filter, comprising the steps of:

operating the mass spectrometer under conditions favoring the generation of positive and negative ions;

alternately transmitting the positive ions and the negative ions at a frequency in excess of 0.1 Hz through the quadrupole filter; and separately extracting the alternately transmitted positive ions and negative ions at the output of the quadrupole filter.

2. The method recited in claim 1 including the steps of:

producing electrical signals representative of the positive ions and the negative ions extracted in the step of extracting; and processing the electrical signals.

3. The method recited in claim 1, wherein the step of operating includes the steps of:

using a reagent gas such as isobutane at a pressure of approximately one torr as a reagent gas; and using perfluorokerosene as an internal standard material.

4. The method recited in claim 1, wherein the step of transmitting includes the step of:

switching the relative potential applied between source and quadrupole filter electrodes.

5. An apparatus for enabling a quadrupole mass spectrometer, having an ion generator with repeller, source and lens electrodes, and a quadrupole filter, to effectively simultaneously generate and monitor both positive and negative ions, comprising:

means for alternately transmitting positive ions and negative ions at a frequency in excess of 0.1 Hz through the quadrupole filter; and dual extraction means for separately extracting the alternately transmitted positive ions and negative ions at the output of the quadrupole filter.

6. The apparatus recited in claim 5, wherein the transmitting means includes:

a plurality of independently adjustable voltage sources;

electronic switching circuit means coupled to the voltage sources for selectively connecting the voltage sources with said quadrupole mass spectrometer; and timing circuit means coupled to the electronic switching circuit means for controlling the switching frequency thereof.

7. The apparatus recited in claim 6, wherein the transmitting means includes:

mode selective switch means coupled to the timing and electronic switching circuit means for selectively disabling the timing circuit means and for selectively establishing a fixed condition of the switching circuit means.

8. The apparatus recited in claim 6 wherein:

the plurality of voltage sources includes at least four independently variable voltage dividers for independently setting desired positive and negative voltage levels.

9. The apparatus recited in claim 7, wherein the transmitting means includes:

output power amplifiers adapted to be coupled between the switching circuit means and the repeller, source and lens electrodes.

10. The apparatus recited in claim 5, wherein the dual extraction means includes:

a pair of electron multiplier tubes adapted to be coupled to the output of the quadrupole filter;

negative biasing means coupled to one of the tubes for attracting positive ions; and positive biasing means coupled to the other tube for attracting negative ions.

11. The apparatus of claim 10 including:

cross-talk reducing means coupled to the dual extraction means for reducing cross-talk between the electron multiplier tubes.

12. The apparatus recited in claim 11, wherein the cross-talk reducing means includes:

a conductive plate including a pair of apertures, the apertures positioned to permit ions to pass through the plate and impinge upon the electron multiplier tubes; and an upstanding separating fin secured to the plate midway between the apertures.

* * * * *

UNITED STATES PATENT AND TRADEMARK OFFICE

CERTIFICATE OF CORRECTION

PATENT NO. : 4,136,280

DATED : January 23, 1979

INVENTOR(S) : Hunt/Stafford

It is certified that error appears in the above-identified patent and that said Letters Patent are hereby corrected as shown below:

Figure 2 - Reference #88 (which refers to the entire switch) does not appear on this drawing and should be inserted.

Column 5 - line 3, the number "70" should read --71--;

Column 5 - line 33, "switchinb" should read --switching--;

Column 8 - line 52, the word "stereo" should be deleted;

Claim 8, lines 28 and 29, should read "...setting desired positive and negative ion voltage levels".

Signed and Sealed this

*Fifteenth* Day of *January 1980*

[SEAL]

*Attest:*

SIDNEY A. DIAMOND

*Attesting Officer* *Commissioner of Patents and Trademarks*